Feb. 23, 1943. J. B. GAFFNEY 2,312,034
APPARATUS FOR COOLING HEATED MATERIAL
Filed April 4, 1941 3 Sheets-Sheet 1

Inventor
Joseph B. Gaffney
By Pennie, Davis, Marvin & Edmonds
Attorneys

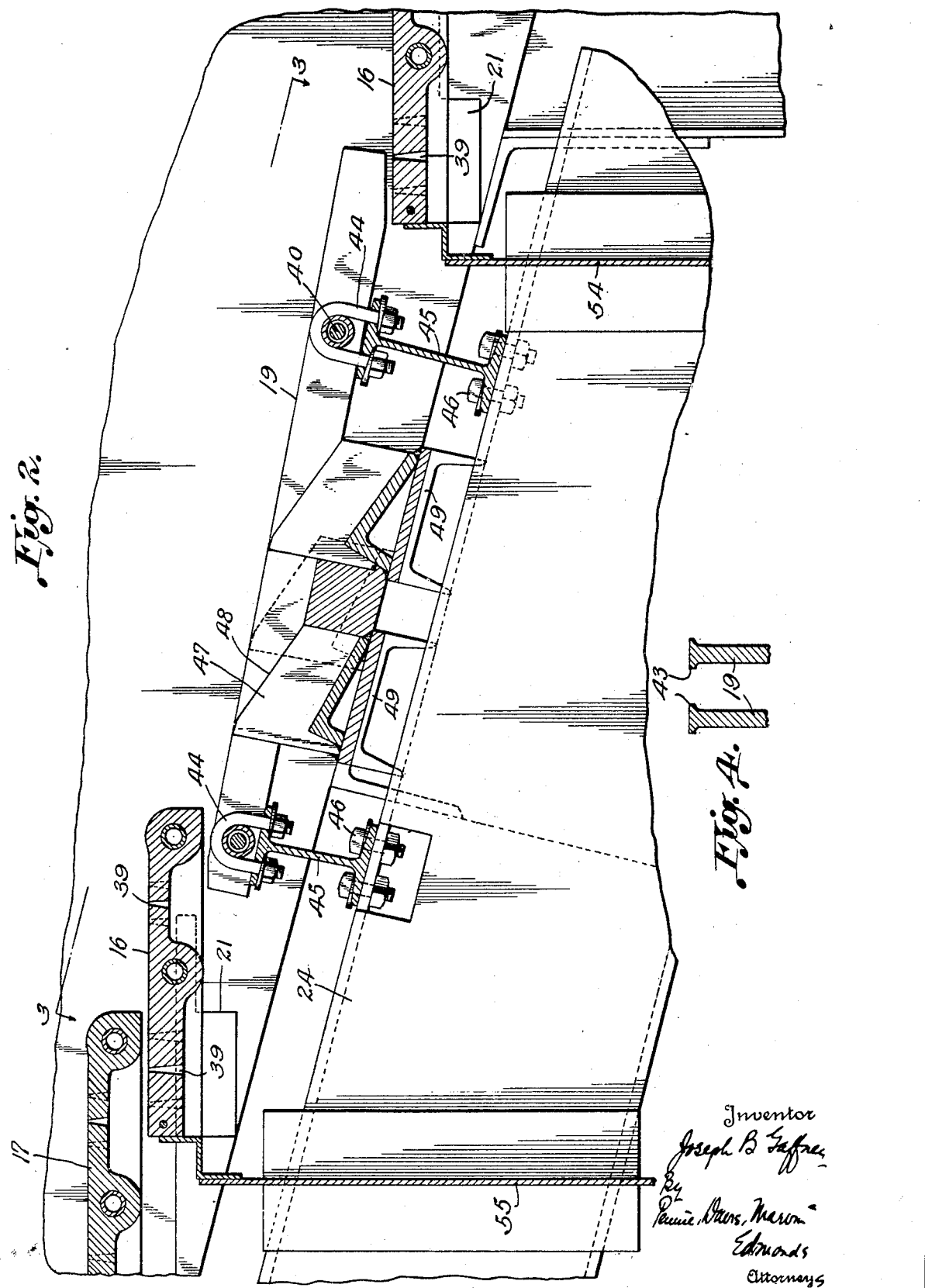

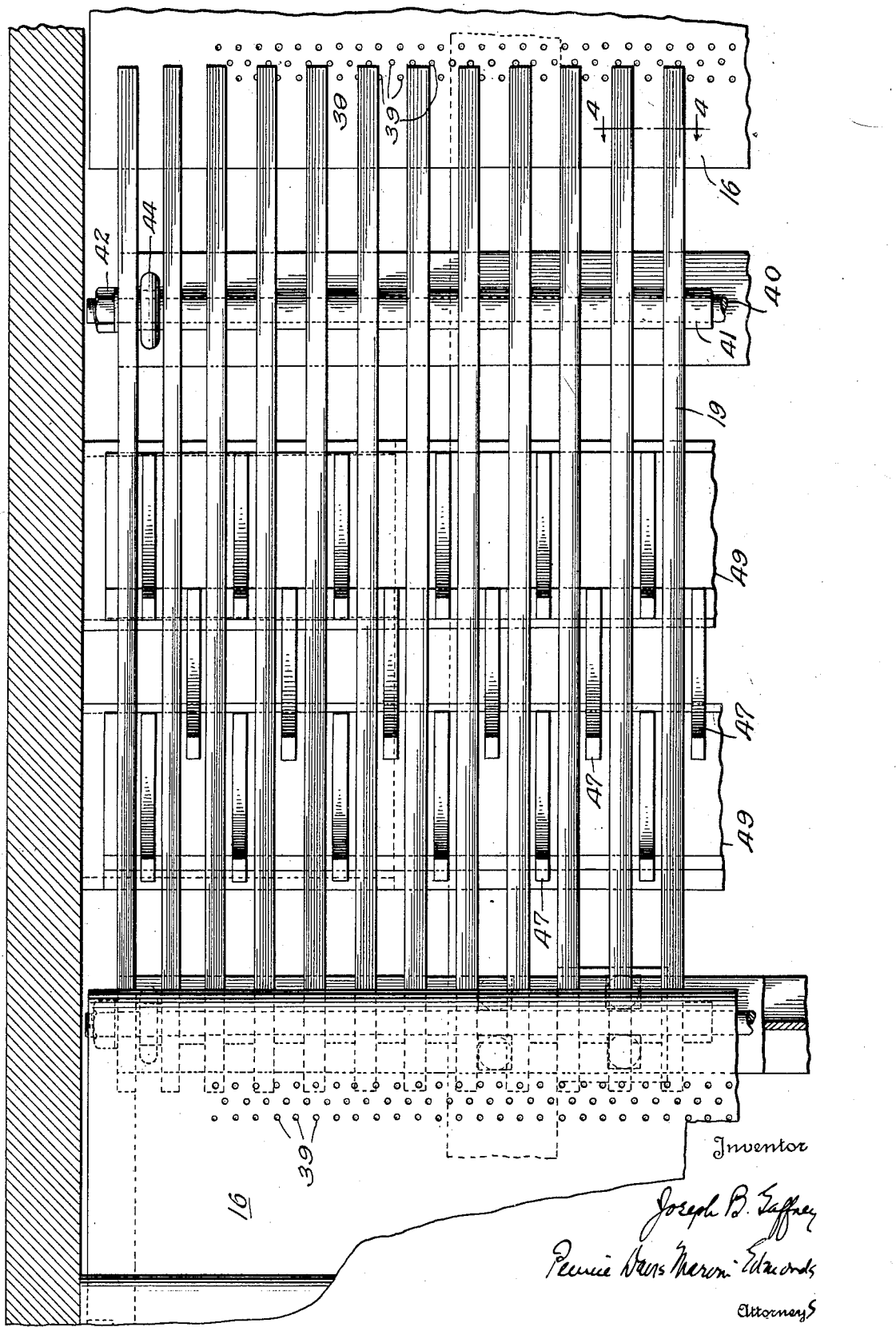

Patented Feb. 23, 1943

2,312,034

UNITED STATES PATENT OFFICE 2,312,034

APPARATUS FOR COOLING HEATED MATERIAL

Joseph B. Gaffney, Hokendauqua, Pa., assignor to Fuller Company, Catasauqua, Pa., a corporation of Delaware Application April 4, 1941, Serial No. 386,829

8 Claims. (Cl. 34—164)

The invention relates to the cooling of materials occurring in a substantial range of particle size, and more particularly to the rapid cooling of materials continuously formed into a moving bed, through which air, or other gas, is forced or drawn to extract heat therefrom. It has especially to do with the cooling of materials such as ores, lime, Portland cement clinker, or the like, when continuously discharged from furnaces, such as rotary kilns, for the rapid reduction of the temperature of the material, the recuperation of sensible heat, or both, or to complete the cooling of such materials discharged from a recuperator.

Heretofore, various methods and apparatus have been employed to cool such materials occurring in a substantial range of particle size for the purposes set forth, examples of such methods and apparatus for a particular purpose being shown and described in the patents to Douglass, Numbers 2,163,513 issued June 20, 1939, and 2,137,158 issued November 15, 1940. The efficiency of the prior method and apparatus is excellent when the material to be treated is of uniform particle size, but it has been found, for example, in the cooling of cement clinker from rotary kilns, that the sizes of the clinker particles vary over a wide range. A number of factors have a decided effect upon the formation of variously sized clinker, as, for example, the conditions under which the clinker is burned and the different compositions of raw material used.

In the prior art, as exemplified in the patents to Douglass, the heated material enters the cooler where it is deposited upon a shelf at the upper end thereof, the material accumulating upon the shelf until a pile has become of such height as to overcome the natural angle of repose of the material. Thereafter, the material passes downwardly onto a downwardly inclined grate mechanism composed of alternate movable and stationary grates. The distribution of the material, due to the sloping pile of material on the uppermost shelf, together with the constant reciprocation of the movable grates, causes the material to be continuously formed as a flat bed, the particles of which are constantly agitated in their movement down the inclined support. It has been found that this constant agitation causes the bed of material to become graded with the smaller particles at the bottom and the larger particles at the top. The process of grading of the variously sized material begins immediately upon movement of the bed down the inclined support, and this gradation is substantially completed at a point removed a considerable distance from the discharge end of the support. Cooling air is passed upwardly through the bed of material during its travel down the inclined support, and due to the gradation of the bed, the smaller particles are the first to be contacted by the air, and as the surface area of these particles is large in comparison to the quantity of heat which they contain, they soon become cooled to the desired temperature. By the time that the bed has become thoroughly graded, all of the smaller sized particles in the lower portion of the bed have become cooled to the desired point. However, the particles of larger sizes, having less surface area per unit volume and quantity of heat contained, require more time and air contact before they are properly conditioned. Accordingly, the grate is extended beyond the point where the smaller particles are cooled to the required temperature and cooling air is continued to be forced through the bed until the uppermost layer of largest particles is cooled to the desired degree.

Under the operating conditions described, the cooling air necessary for cooling the larger particles must be forced through the dense lower portion of the bed after such portion has reached its desired temperature. Such operation causes the lower portion of the bed to be cooled below the desired point and also results in inefficient operation in the cooling of the larger particles, in that the abundance of fine particles in the bed greatly increases its resistance to the flow of cooling air. Since the air is ordinarily supplied under fan pressure, and fan efficiency rapidly decreases as the pressure necessary to overcome resistance rises, it will be realized that a substantial part of the power consumed in providing adequate air flow is required because of the presence of the fine particles, especially after they have been segregated in the lower levels in the bed. Further losses in efficiency occur because the cooling air, before it reaches the larger particles, is heated to some extent by passing through the bed of fine material.

The present invention is, accordingly, directed to the provision of an apparatus by which heated material in a substantial range of particle size, may be deprived of the heat contained therein, in an efficient manner at low cost, and with the production of a uniform product. In the use of the new apparatus, the hot clinker is deposited upon a downwardly sloping support, having an angle less than the angle of repose of the material, where it is continuously formed into a flat bed. The bed is intermittently and regularly advanced down the support while being constantly agitated, such operation causing the bed to become graded, with the smaller particles at the bottom and the larger particles at the top. A flow of cooling gases is maintained through the bed in a direction from the bottom toward the top thereof during its travel down the support, and the constant agitation causes the surfaces of all of the particles to be brought in contact with the cooling medium. The smallest particles in the lower portion of the graded bed are contacted by the coolest gases and this, together with the fact that the surface area of the small particles is relatively great per unit volume, causes the particles in the lower portion of the bed to be reduced rapidly to the desired temperature.

At the point in the downward travel over the support where a substantial portion of the particles in the lower portion of the bed has been reduced in temperature to the desired point, those smaller particles are removed from the bed and the remainder thereof, comprising the relatively hot, coarser particles continues to travel over the support, where such larger particles are directly contacted by the coolest air. Heat transfer, accordingly, is more rapid and efficient, because this portion of the bed has a much lower resistance to air flow, and consequently less air pressure is required.

It will be understood that the invention has a wide range of utility and may be employed in various combinations with other heat exchange apparatus. For example, it may be used to air quench Portland cement clinker discharged directly from a rotary kiln and to cool the clinker to a temperature satisfactory for grinding. For such use, the cooling air is divided into at least two and preferably more streams to be forced through succeeding sections of the clinker bed. One such stream, at least equal in quantity to the requirement of the kiln for secondary combustion air, less that quantity induced around the nose ring, is forced through the hottest section of the bed, adjacent to the kiln, to return a maximum of heat to the kiln as pre-heated secondary air. This stream may also be divided and a controlled portion forced through the clinker as it enters the bed, to cause an abrupt freezing of the liquid phase. The rest of the air necessary to continue cooling to the desired point, for example, to a temperature satisfactory for grinding, is separately forced through the remainder of the bed, in the final or secondary cooling section of the cooler. As the quantity of air that may be returned to the kiln from the recuperating or primary section of the cooler, is usually insufficient to cool the fine clinker particles to the desired point, the fine particles are retained in the bed for a limited time in the secondary cooling section and are then removed at an intermediate point in this section. The remainder of the air necessary to complete cooling is, accordingly, preferably divided and a quantity necessary to reduce the temperature of the fine particles is forced through the bed in the secondary section between the entrance to the latter and the point where the fine particles are removed. The air necessary for completely cooling the coarse particles is forced through the remainder of the bed, and, as resistance to flow is decreased, it may be at lower pressure.

It will also be understood that the invention may be used to complete the cooling of clinker, or similar material, previously partially cooled in a separate heat recuperator.

For a better understanding of the invention, reference may be had to the accompanying drawings illustrating one form of apparatus suitable for the practice of the method. In the drawings—

Figure 2 is an enlarged section of a portion of the grate mechanism shown in Fig. 1.

Figure 3 is a partial plan view taken on line 3—3 of Fig. 2.

Figure 4 is a partial sectional view taken on line 4—4 of Fig. 3.

Figure 1:
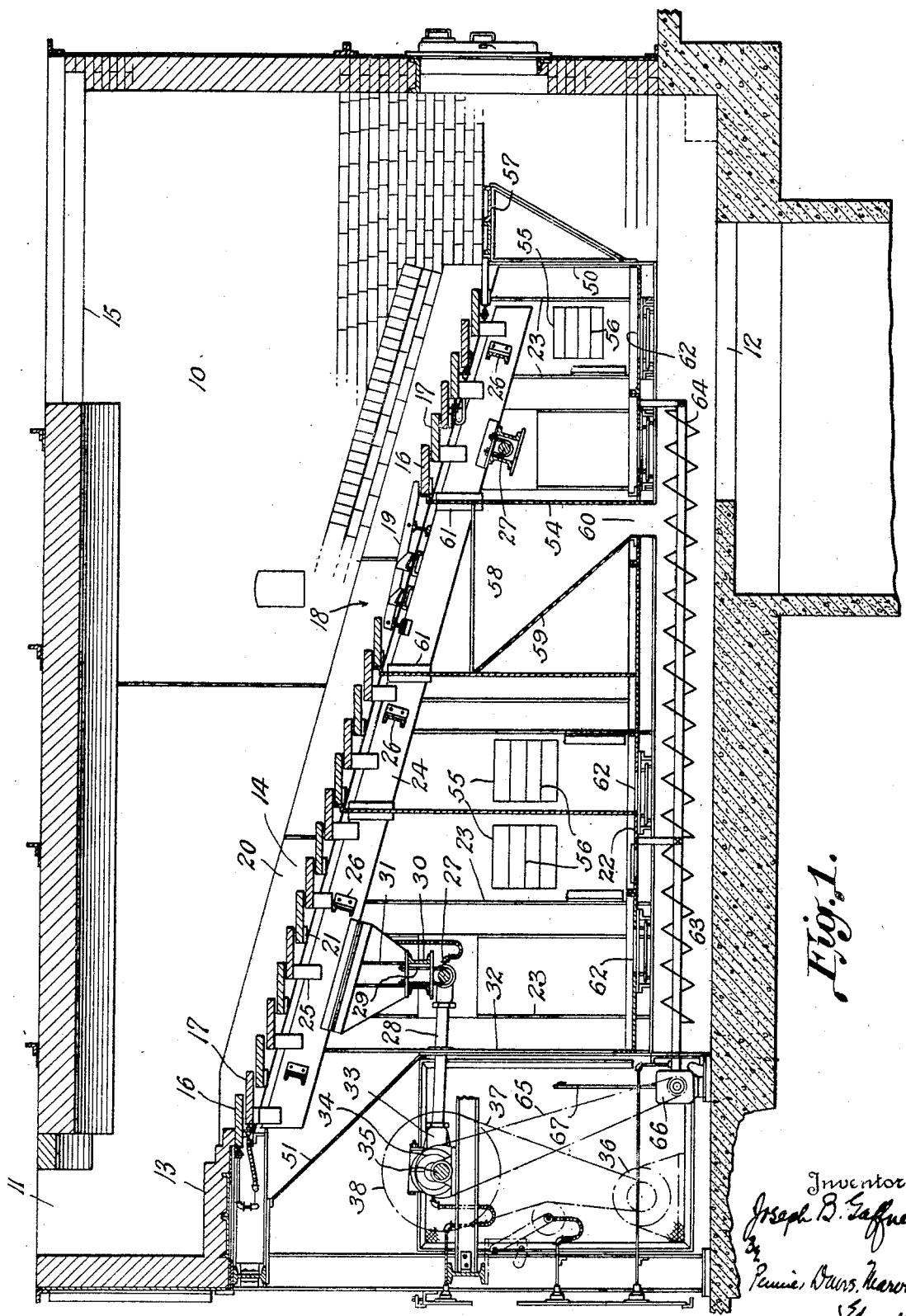
Figure 1 is a vertical section through the apparatus.

Referring to the drawings, the apparatus illustrated will be seen to include a cooling chamber 10 having an inlet port 11 and a discharge opening 12. Heated material entering the chamber through the inlet port 11 accumulates upon a shelf 13, such material building up upon the shelf in a pile until a natural angle of repose is reached, the material thereafter entering the chamber being distributed by the pile of material in such manner as to form a substantially flat bed on a downwardly inclined support 14. The slope or pitch of the support is less than the angle of repose of the material to be treated and is preferably such that the larger particles will not roll downwardly freely.

The walls of the cooling chamber above the inclined support are constructed of ceramic or other heat-resisting material in order to withstand the high temperatures of the air after it has passed through the heated material, and an exit opening 15 for the heated air, or any part of it not used to support combustion in the furnace (not shown), is provided in the top wall.

The downwardly inclined support comprises a series of alternately arranged slightly vertically spaced, horizontal, fixed and movable grates 16 and 17 at its upper end and a similar series of alternately arranged fixed and movable grates 16 and 17 at its lower end, the grates of the upper and lower series extending transversely of the support. A grizzly denoted generally at 18 and having spaced longitudinal bars 19 extending downwardly in the direction of the support is positioned intermediate the upper and lower series of transverse grates. The downward slope of the bars 19 is substantially the same as the supporting surface formed by the series of fixed and movable grates, and the lowermost grate of the upper series of transverse grates overlaps the upper end portion of the grizzly bars 19 and the uppermost grate of the lower series of transverse grates is positioned immediately below the lower end portion of the grizzly bars 19. With this arrangement, a continuous support is formed for the material and the upper surface of the support is substantially in a plane.

The fixed and movable transverse grates are supported respectively on stationary and movable frames. The stationary frame comprises inclined channel members 20 which may be positioned in the side walls of the chamber 10 and extend the entire length of the support. The fixed grates may be securely attached to the channels 20 in any desired manner, as by being welded to lugs 21 extending from the channel for this purpose. A floor 22 beneath the inclined support provides a base support for vertical channels 23 which in turn support the stationary side channels 20 to which they are securely attached.

The movable frame comprises a pair of spaced inclined channel members 24 to which the movable transverse grates are attached as by uprights 25 which may be welded or otherwise secured to the grates and channels. The channels 24 are connected and braced by cross members 26 to form a rigid assembly. The movable frame is secured to and supported by axles 27 which in turn are supported by wheels (not shown) to permit reciprocating longitudinal movement of the movable frame.

The reciprocating motion of the movable frame may be conveniently effected by one or more eccentrics of the conventional type comprising eccentric rod 28 pivotally connected to axle 27, and movement imparted to the axle 27 is transmitted to the movable frame by a strap 29 rigidly connected to this frame by housing 30 and channel 31. The rod 28 passes through a slot in the rear wall 32 and terminates in the usual strap 33 surrounding eccentric disc 34 carried by shaft 35. A suitable variable speed motor 36 drives the shaft 35 at the desired speed through belt 37 and pulley 38. The thickness of the bed of material on the grates is readily controlled by the speed of the motor 36.

The adjacent transverse grates are spaced vertically a distance, usually ¼ inch, to form horizontal air passageways, and each such grate contains rows of tapered holes 39 near the forward and rear edges to form additional air passageways.

The longitudinal bars 19 of the grizzly as more clearly shown in Figures 2 and 3, are assembled as a unit upon rods 40 with spacers 41, also carried by the rods, lying between adjacent bars to maintain them in proper relation. Clamping nuts 42 at the end of the rods permit the bars and spacers to be drawn together tightly to insure the proper spacing under all conditions whereby a discharge of uniform particle size is obtained. To facilitate the discharge of the particles through the spaces between adjacent bars, the upper portion of each bar is formed with a head 43, so that only the particles between adjacent heads are free to pass downwardly. U-bolts 44 secure the assembly of bars 19 to transverse I-beams 45 which are in turn secured to the channels 24 of the movable frame by bolts 46. It will thus be apparent that the assembly of longitudinal bars will reciprocate with the movable transverse grates upon movement of the channels 24.

In order that the material descending the support will not pile up upon the longitudinal bars of the grizzly, pusher blades 47 are positioned between adjacent bars 19, these blades having a downwardly sloping upper surface 48 of an angle substantially greater than that of the downward slope of the bar assembly. The blades are supported at their base by channels 49 upon which they may be welded or otherwise secured, the channels 49 being in turn secured to the channels 20 of the stationary frame. Although the pusher blades have been shown positioned between the bars 19 in a staggered relation, it will be obvious that any number or arrangement of these blades may be used. Upon each backward movement of the movable frame, to which the longitudinal bars 19 are attached, the stationary blades will enter the bed of material to force the bed downward along the support at a uniform rate.

The space below the downwardly inclined support and between the side walls of the chamber 10 is closed in an air tight manner by front and rear end walls 50 and 51 respectively which extend downwardly from the bottom of the support and have their lower ends joined to the floor 22 to complete the enclosure. To control the passage of air through the bed at desired sections along its length, the enclosure below the support is divided into separate air chambers by partitions 52, 53 and 54. Air is supplied to the several compartments by suitable means, such as one or more fans (not shown) connected to inlet ports 55 positioned in the side wall of each compartment. Louver dampers 56 in each inlet port control the passage of air therethrough and in this manner, the desired pressures may be maintained in the several compartments to effect efficient operation for either heat recuperation or fan operation or both. Attached to the front wall 50 of the enclosure is a deflector 57 to receive the material discharged from the lower end of the support and direct such material to the discharge opening 12.

That portion of the inclined support beneath the grizzly is closed to the upward passage of air by a discharge hopper 58 having a front wall which is formed by a portion of the division wall 54, and a rear wall 59, the division wall 54 and the rear wall 59 being attached to the rear edges of the stationary transverse grates adjacent the lower and upper ends of the longitudinal grizzly bars respectively. The hopper 58 receives the material passing through the longitudinal bars and directs it to the discharge opening 60. Seals 61 carried by the division walls and positioned in the openings through which the channels 24 pass during the reciprocation of the movable frame, prevent substantial passage of air through these openings. In this manner the flow of air from one compartment to the other or through the bed as it passes over the longitudinal bars is eliminated, and the discharged material is permitted to pass downwardly without obstruction and without causing a dusty condition.

Part of the material being cooled will find its way into the air chamber because of the reciprocation of the movable grates and to remove an accumulation of this material, gates 62 are provided in the floor 22. Upon opening of these gates, the air under pressure in the chamber will blow the accumulated material through the gates to a passageway 63 beneath the floor 22 where a screw conveyor 64 will move it forward together with the material from the hopper 58 to the discharge opening 12. The screw conveyor 64 is driven indirectly by the motor 36 through belt 65 and transmission 66, a transmission lever 67 controlling operation of the screw when such means are required.

The operation of the device is extremely simple and because of its simplicity is particularly adapted in its field. The material entering the inlet opening 11 continuously takes the form of a flat bed upon the upper series of transverse grates and the constant reciprocation of the movable transverse grates causes the bed to travel uniformly down the incline. As the thickness of the bed which may be efficiently treated will vary with materials having different characteristics, a reciprocating speed for the movable grates is selected which will maintain the proper bed for the material being treated. The constant agitation of the particles of the bed and their tumbling from one grate to the next causes the bed to become graded with the larger particles at the top and the smaller particles at the bottom. As the linear speed of the grates is very small, very little noise or vibration takes place and the mechanism is subjected to only slight wear over long periods of operation.

The cooling air is forced into the air chambers below the inclined support and passes upwardly through the vertical and horizontal openings in the support and through the bed in a plurality of directed streams. The dispersion of the air through the bed in this manner together with the constant agitation and tumbling of the particles causes a large surface area of the material to be contacted by the air and rapid cooling takes place. The smaller particles, which are moved to the bottom of the bed by the action of the upper series of transverse grates, have a large surface area relative to the amount of heat contained therein, and since they are contacted by the coolest air, they are reduced in temperature by the time they reach the longitudinal bars of the grizzly 18. As the bed passes over the bars, the particles in the bottom of the bed smaller in diameter than the distance between adjacent heads fall through the spaces between the bars and are directed to the discharge opening. As the bed continues its downward movement and reaches the lower series of transverse grates, the cooling air passing through that portion of the bed is permitted to come into direct contact with the larger particles of the material being treated and thus more efficiently extract the remaining heat therefrom. The louver dampers controlling the flow of air to the several air compartments may be operated to increase or decrease the pressure in the individual compartments to cause the passage of the desired quantity of air through the portions of the bed directly above the compartments, regardless of the resistance offered by the bed.

Although the apparatus shown includes only one discharge assembly intermediate the ends of the support, it will be obvious that others could be spaced along the support to remove particles of various sizes as they reach the desired temperature.

I claim:

1. In an apparatus for cooling heated material occurring in a substantial range of particle size, the combination of a cooling chamber having an entrance port for the heated material at one end and a discharge port at the other end, a downwardly inclined support in the chamber having its upper end adjacent the inlet to receive the material, the upper surface of the support serving to support a substantially flat bed of particles, said support comprising a plurality of series of spaced overlapping transverse grates, the grates lying in stepped relation with fixed grates alternating with movable grates, means for reciprocating the movable grates to cause the material in the bed to travel downwardly along the support, and means intermediate adjacent series of transverse grates having openings therein for removal of particles below a predetermined size from the bottom of the bed, the upper surfaces of the series of transverse grates and of said last-named means being in substantially the same plane.

2. In an apparatus for cooling heated material occurring in a substantial range of particle size, the combination of a cooling chamber having an entrance port for the heated material at one end and a discharge port at the other end, cooling elements in the chamber comprising a plurality of series of slightly vertically spaced overlapping transverse grates, fixed grates alternating with movable grates, grizzly means disposed between adjacent series of transverse grates for removing material particles below a predetermined size, the upper surfaces of the series of transverse grates and the grizzly means being in substantially the same plane and constituting a continuous support for a bed of material, means for reciprocating the movable transverse grates to agitate and advance the bed, means for advancing that portion of the bed remaining on the grizzly means, and means for introducing air under pressure into that portion of the chamber below the transverse grates, the air escaping between the transverse grates and entering the bed in the direction of its travel.

3. In an apparatus for cooling heated material occurring in a substantial range of particle size, the combination of a cooling chamber having an entrance port for the heated material at one end and a discharge port at the other end, a downwardly inclined support in the chamber having its upper end adjacent the inlet to receive the material, the upper surface of the support serving to support a substantially flat bed of particles, said support comprising a plurality of series of spaced overlapping transverse grates, fixed grates alternating with movable grates, means for removing particles below a predetermined size from the bottom of the bed at points intermediate adjacent series of transverse grates comprising a grizzly having bars extending longitudinally of the support and spaced transversely a distance equal to the maximum diameter of the particles to be removed, the upper surfaces of the series of transverse grates and the longitudinal bars being in substantially the same plane, means for reciprocating the movable transverse grates to agitate and advance the bed, means for advancing that portion of the bed remaining on the longitudinal bars, and means for introducing air under pressure into that portion of the chamber below the transverse grates, the air escaping between the transverse grates and entering the bed in the direction of its travel.

4. In an apparatus for cooling heated material occurring in a substantial range of particle size, the combination of a cooling chamber having an entrance port for the heated material at one end and a discharge port at the other end, a downwardly inclined support in the chamber, the upper surface of the support serving to support a substantially flat bed of material particles, said support comprising a series of spaced overlapping transverse grates at its upper end with fixed grates alternating with movable grates, a second series of spaced overlapping transverse grates at its lower end with fixed grates alternating with movable grates, means for removing particles below a predetermined size from the bottom of the bed intermediate the upper and lower series of transverse grates, said means comprising a grizzly having bars extending longitudinally of the support and connecting the upper and lower series of transverse grates, the upper surfaces of the upper and lower series of transverse grates and the longitudinal bars being in substantially the same plane, said bars being spaced transversely a distance equal to the maximum diameter of the particles to be removed, means for reciprocating the movable transverse grates to agitate and advance the bed, means for advancing that portion of the bed remaining on the longitudinal bars, and means for introducing air under pressure into that portion of the chamber below the transverse grates, the air escaping between the transverse grates and entering the bed in the direction of its travel.

5. In an apparatus for cooling heated material occurring in a substantial range of particle size, the combination of a cooling chamber having an entrance port for the heated material at one end and a discharge port at the other end, cooling elements constituting a downwardly inclined support for a bed of the material in the chamber, said cooling elements comprising a plurality of series of spaced overlapping transverse grates, fixed grates alternating with movable grates, means for removing particles below a predetermined size from the bottom of the bed at points intermediate adjacent series of transverse grates, said means comprising a grizzly assembly having a plurality of bars extending longitudinally of the support in the direction of movement of the bed and spaced transversely a distance equal to the maximum diameter of the particles to be removed, the upper surfaces of the series of transverse grates and longitudinal bars being in substantially the same plane to form a continuous support for the bed, pusher plates between adjacent longitudinal bars, means for reciprocating the movable transverse grates and longitudinal bars to agitate and advance the bed, and means for introducing air under pressure into that portion of the chamber below the transverse grates, the air escaping between the transverse grates and entering the bed in the direction of its travel.

6. In an apparatus for cooling heated material occurring in a substantial range of particle size, the combination of a cooling chamber having an entrance port for the heated material at one end and a discharge port at the other end, a downwardly inclined support in the chamber, the upper surface of which serves to support a substantially flat bed of particles, said support comprising a plurality of separated series of spaced overlapping transverse grates, fixed grates alternating with movable grates, a grizzly between adjacent series of transverse grates to remove particles below a predetermined size from the bottom of the bed as the bed passes from one series to the next, said discharge means comprising a plurality of movable bars extending longitudinally of the support and spaced a distance equal to the maximum diameter of the particles to be removed, the upper surfaces of the series of transverse grates and longitudinal bars being in substantially the same plane to form a continuous support for the bed of material, stationary pusher plates between adjacent longitudinal bars, means for reciprocating the movable transverse grates and longitudinal bars to agitate and advance the bed, means for introducing air under pressure into that portion of the chamber below the transverse grates, the air escaping between the transverse grates and entering the bed in the direction of its travel, and a hopper beneath that portion of the support constituting the grizzly for sealing the bed at this point against the upward flow of air and for directing the particles passing through the longitudinal bars to the discharge port.

7. In an apparatus for cooling heated material occurring in a substantial range of particle size, the combination of a cooling chamber having an entrance port for the heated material at one end and a discharge port at the other end, a downwardly inclined support in the chamber having one end adjacent the inlet port to receive the material, the upper surface of which serves to support a substantially flat bed of material particles, said support comprising a plurality of series of slightly vertically spaced, horizontal overlapping transverse grates, fixed grates alternating with movable grates, a grizzly between and connecting adjacent series of transverse grates and acting to remove particles below a predetermined size from the bottom of the bed as the bed passes from one series of grates to the next, said grizzly comprising a plurality of movable bars extending longitudinally of the support and spaced a distance equal to the diameter of the particles to be removed, stationary pusher plates between adjacent longitudinal bars, the fixed transverse grates and pusher plates being secured to inclined side plates of a stationary frame, the movable transverse grates and longitudinal bars being secured to and supported above a movable frame, means for reciprocating the movable frame to agitate the bed and advance it intermittently and regularly, means for introducing air under pressure into that portion of the chamber below the transverse grates, the air escaping between the transverse grates and entering the bed in the direction of its travel, and a hopper sealing the bed against passage of air therethrough as it passes over the grizzly, said hopper directing the particles passing through the longitudinal bars to the discharge port.

8. In an apparatus for cooling material occurring in a substantial range of particle size, the combination of a cooling chamber having an entrance port for the material at one end and a discharge port at the other end, a downwardly inclined support in the chamber for receiving the material particles and having its upper end adjacent the inlet port, the surface of the support serving to support a substantially flat bed of material particles, said support comprising a series of slightly vertically spaced, horizontal, overlapping transverse grates at its upper end with fixed grates alternating with movable grates in the series, a second series of transverse grates similar to those at the upper end positioned at the lower end of the support, a grizzly between and connecting the upper and lower series of transverse grates for removing particles below a predetermined size from the bottom of the bed as the bed passes from the upper to the lower series, said grizzly comprising a plurality of movable bars extending longitudinally of the support and spaced a distance equal to the maximum diameter of the particles to be removed, stationary pusher plates between adjacent longitudinal bars, the fixed transverse grates and pusher plates being secured to inclined side plates of a stationary frame, the movable transverse grates and longitudinal bars being secured to and supported above a movable frame, means for reciprocating the movable frame to agitate the bed and advance it intermittently and regularly, means for introducing air under pressure into that portion of the chamber below the transverse grates, the air escaping between the transverse grates and entering the bed in the direction of its travel, and a hopper sealing the bed against passage of of air therethrough as it passes over the grizzly, said hopper directing the particles passing through the longitudinal bars to the discharge port.

JOSEPH B. GAFFNEY.